Dec. 26, 1967   H. SEIDEN   3,360,697
TRIMMER CAPACITOR WITH DIRECT TRAVEL MECHANISM
Filed March 29, 1962   2 Sheets-Sheet 1
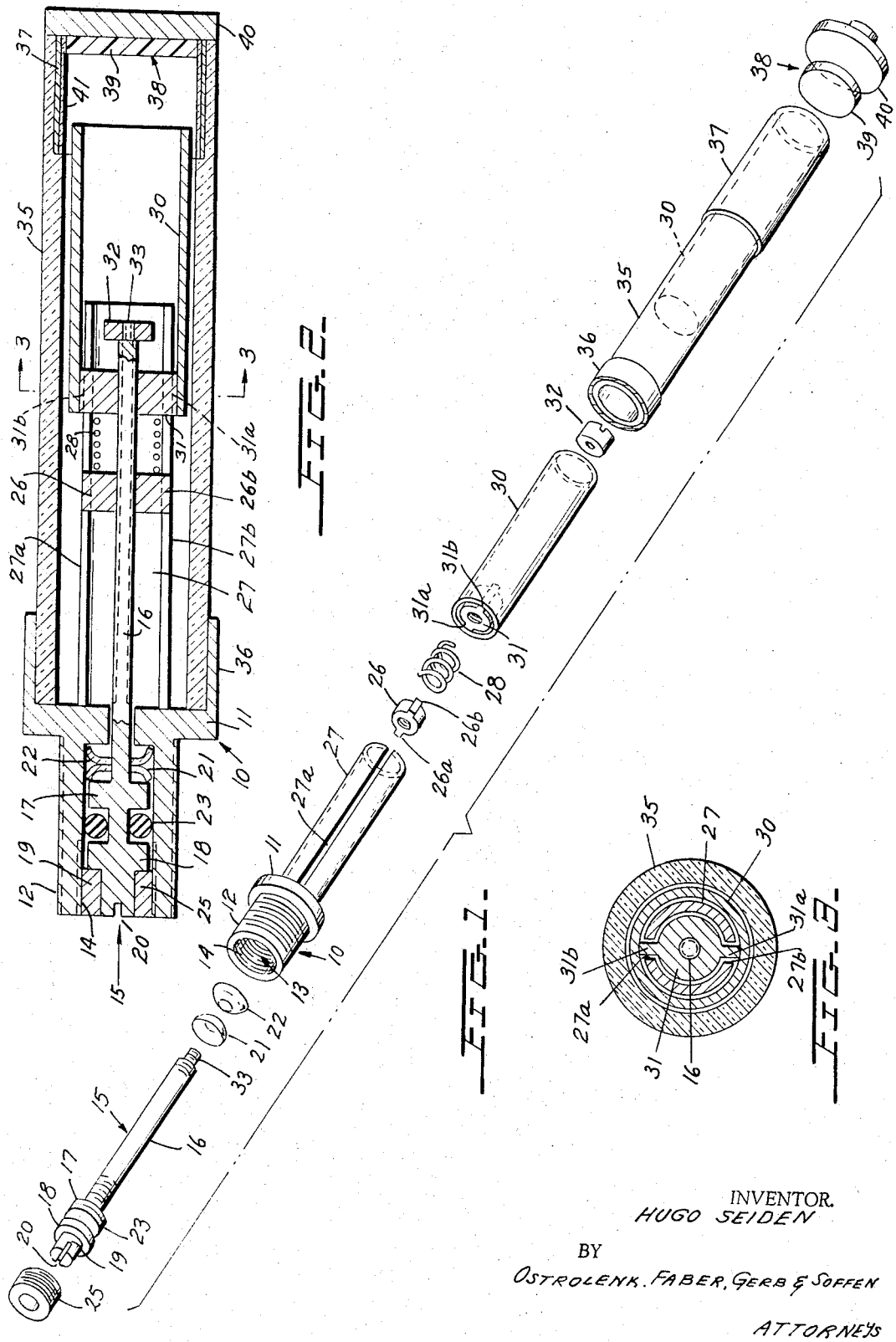
INVENTOR.
HUGO SEIDEN
BY
OSTROLENK, FABER, GERB & SOFFEN
ATTORNEYS

INVENTOR.
HUGO SEIDEN
BY
OSTROLENK, FABER, GERB & SOFFEN
ATTORNEYS

United States Patent Office 3,360,697
Patented Dec. 26, 1967

3,360,697
TRIMMER CAPACITOR WITH DIRECT TRAVEL MECHANISM
Hugo Seiden, Brooklyn, N.Y., assignor to JFD Electronics Corporation, Brooklyn, N.Y., a corporation of New York
Filed Mar. 29, 1962, Ser. No. 183,512
2 Claims. (Cl. 317—249)

My invention relates to adjustable electrical devices and more specifically relates to a novel adjustable electrical device having first and second cooperating components which move with respect to one another in a highly linear manner.

Devices to which the invention applies could be used in tuning or trimming applications and could be capacitors or inductors. In the foregoing, the invention will be described as a trimmer capacitor, it being understood that the inventive concepts herein have the wider applications described above.

Trimmer capacitors are well known for use in the precision adjustment of capacitances. Such trimmer capacitors are often formed as tubular members as shown in U.S. Patent 2,922,093 which is assigned to the assignee of the present invention.

Tubular trimmer capacitors are highly sensitive in adjustment when the electrode is carried within a dielectric housing, due to the relatively thin dielectric gap obtained by the construction. In particular, where the capacitor is of the type in which the electrical band is fitted near the inner diameter of a dielectric body, it has been found that the linearity of capacitance to movement of the adjusting member can be seriously affected due to variable air gaps between the outer surface of the adjustment slug and the electrode. The linearity sometimes is so affected that there will be an actual reversal in capacitance at some point along the curve. The variable air gaps and variations in dielectric thickness which principally cause this effect are particularly apparent when the adjustment slug is rotated during adjustment.

The principal object of the present invention is to provide a novel sensitive adjustable electrical device whose electrical parameter is linearly adjustable and does not exhibit reversals during adjustment.

A further object of this invention is to provide a novel adjustable device wherein a slug is movable with respect to a cooperating member with a direct linear non-rotating travel.

A further object of this invention is to provide a novel electrical device which is completely sealed from its external environment.

Another object of this invention is to provide a novel adjustable capacitor which is readily adaptable to be panel mounted and to printed wiring arrangements, both standard and miniaturized as well as sealed and open types and which provides a high degree of linearity of adjustment.

Another object of this invention is to provide a novel telescopic tuning slug which moves in a direct travel manner under the influence of an adjustment screw shaft within a cylinder and therefore decreases the length of the device.

A further object of this invention is to provide a novel adjustment mechanism for an adjustable electrical device wherein a novel backlash absorbing means is connected to the adjustment screw.

A further object of this invention is to provide a novel trimmer capacitor which utilizes a direct travel mechanism for adjusting the capacitance of the device.

Another object of this invention is to provide a novel trimmer capacitor in which a rotatable slug transmits linear non-rotating motion to an adjustable member within the capacitor.

Another object of this invention is to provide a novel adjustable electrical device wherein one of the cooperating elements is contained within the wall of an insulation tube.

In capacitor devices of the general type described above, the movable adjusting member is a thin walled piston. This piston can be selected from a wide range of conductive materials. For example, any low expansion high nickel alloy such as the alloy known as Invar can be used. In forming such pistons, I have found that acceptable units can be made when the piston is machined. However, I have discovered that when the piston is drawn rather than machined, that the stability of the device is substantially improved and that negligible drift devices can be formed. The theoretical reasons for this substantial difference in operation are not understood, but the distinction is quite apparent from experiments which have been performed with the two types of piston.

Accordingly, a further object of this invention is to provide a novel piston for an electrical device which is drawn.

Another object of the invention is to improve the stability of a trimmer capacitor by using a drawn piston.

These and other objects of my invention will become apparent from the following description when taken in connection with the drawings, in which:

FIGURE 1 shows an exploded perspective diagram of an embodiment of the invention.

FIGURE 2 shows a side cross-sectional view of the device of FIGURE 1 when assembled.

FIGURE 3 is a cross-sectional view of FIGURE 2 taken across the lines 3—3 in FIGURE 2.

Figure 4:
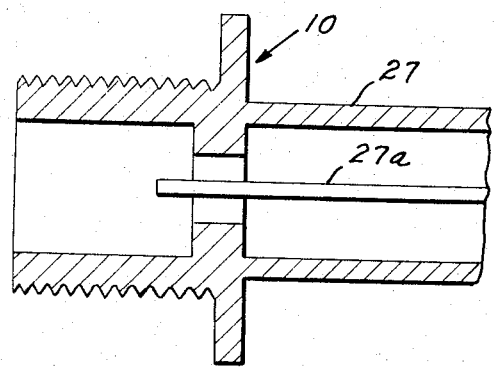
FIGURE 4 illustrates the manner in which the length of the capacitor device can be decreased by extending slots into the interior of the bushing.

Referring now to FIGURES 1, 2 and 3, the novel device is comprised of a bushing 10 which has a mounting flange 11 and a threaded mounting portion 12 which could, for example, receive a nut for mounting the device to a panel.

The bushing 10 has internal opening 13 extending therethrough which is threaded as shown by threads 14. An adjustment member 15 extends through opening 13, and is comprised of an elongated threaded shank portion 16, and a head portion which formed of first and second flanges 17 and 18 respectively and a tool receiving portion 19 which has, for example a slot 20 which can receive a screwdriver.

A first and second Belleville washer 21 and 22 respectively are first mounted on the shank 16 of adjusting member 15 and on O ring 23 is captured between flanges 17 and 18. Thereafter, the member 15 is inserted through opening 13 as illustrated in FIGURE 2 so that the right hand side of flange 17 or alternatively the left hand side of flange 18 bears against the Belleville washers 21 and 22. An adjustment and retaining nut 25 is then threaded into threads 14 and against the left hand side of flange 18 to cause compression of the Belleville washers 21 and 22 and to capture member 15 in bushing 10. By appropriately adjusting screw 25, a specific torque will be thereafter required to rotate screw 15 with respect to bushing 10.

It is to be noted that the adjusting screw 25 of FIGURES 1 and 2 could be replaced by any other capturing arrangement and, after torque adjustment, could be permanently secured to bushing 10.

Thereafter, a tension nut 26 which has extending ear portions 26a and 26b is threaded on shank 16. The ear portions 26a and 26b are received in slots 27a and 27b of bushing portion 27 which is secured to the right hand side of flange 11. Thus, rotation of screw 15 will cause the tension nut 26 to move with transverse motion along the axis of bushing 27 without rotating.

If desired, slots 27a and 27b of FIGURES 2 and 3 can be broached into the inner diameter of bushing 10 to permit greater travel of nut 26 to decrease the required length of the device as shown in FIGURE 4. A helical spring is then inserted within bushing 27 and against the right hand side of tension nut 26.

A movable piston 30 is then formed to have a nut 31 captured therein which has extending ears 31a and 31b in a manner similar to the construction of tension nut 26. The ears 31a and 31b of nut 31, however, extend beyond the outer diameter of bushing 27 to provide clearance between the inner diameter of piston 30 and the outer diameter of bushing 27 which are telescoped into position with respect to one another.

The ears 31a and 31b of nut 31 can be directly secured to the inner walls of piston 30. If desired, the outer surfaces of the ears 31a and 31b can have threads which are received by cooperating threads on the inner diameter of the piston 30 with the nut 31 being threaded into position and then staked to piston 30.

Figure 6:
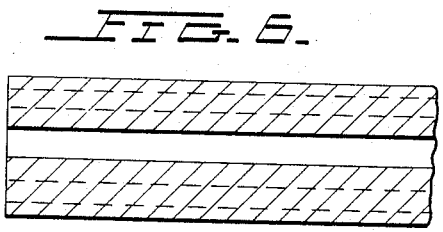
FIGURE 6 is a side cross sectional view of the piston of FIGURE 5 taken across lines 6—6 in FIGURE 5.
Figure 5:
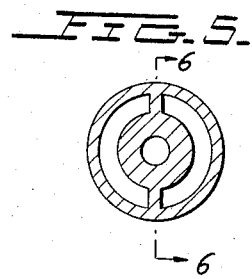
FIGURE 5 is a cross sectional view of the piston of FIGURES 1, 2 and 3.

Moreover, the nut 31 can be an integral part of piston 30 with ears 31a and 31b extending along the full length of the piston. In such a case, the piston 30 and nut 31 could be extruded as a unitary body as shown in FIGURES 5 and 6.

As a further feature of the invention, experiment has shown that piston 30, which is of any desired low expansion alloy material, will produce improved stability for the overall device when it is drawn rather than machined. This theoretical reason for this is not understood and no attempt will be made herein to analyze this unexpected behavior.

In assembling piston 30 and bushing 27, as shown in FIGURE 1, the nut 31 is threaded on shank 16 after the helical spring 28 is placed in position with ears 31a and 31b of screw 31 entering slots 27a and 27b of bushing 27. Moreover, sufficient spacing is permitted between nuts 26 and 31 so that the spring 28 pre-loads the connection between piston 30 and tension nut 26 to eliminate backlash between shank 16 and the internal thread in nut 31. Thereafter, a stop nut 32 or any other desired stop means is threaded on the reduced threaded portion 33 of shank 16 to prevent piston 30 from being disassembled from screw 16 when screw 31 reaches its maximum travel on shank 16.

A dielectric precision glass cylinder 35, which carries electrode band 37 and attachment 36 is then secured to bushing 10 as by soldering from band 36 to flange 11 to the bushing 10 and snugly receives piston 30.

An end cap 38 formed of an insulation washer 39 and conductive terminal member 40 then seal the cylinder 35. The insulation washer 39 insures against accidental contact between the end of piston 30 and terminal 40.

The electrode band 37 is carried or embedded between two glass cylinders 35 and 41. Thus, the end of cylinder 35 may be under cut as shown as undercut section 40 and conductive band 37 may be deposited therein. An insulation sleeve 41 may be then applied over band 40 to prevent shortening between piston 30 and band 37. Clearly, the band 37 could be embedded in glass tube 35 in any other desired manner. It is to be further noted that band 37 could also be placed on the outer diameter of tube 35 as shown in FIGURE 7.

Figure 7:
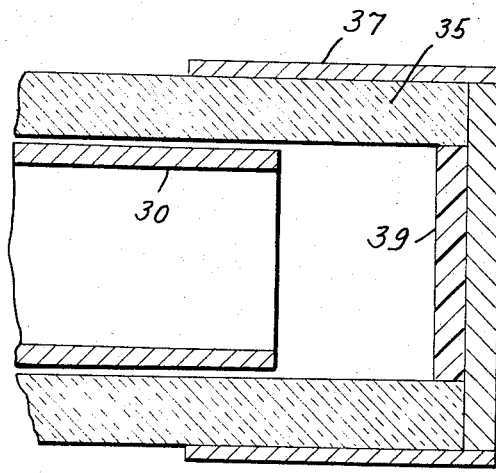
FIGURE 7 shows a modification of the manner in which the embedded electrode of FIGURE 2 may be placed on the external surface of the dielectric form.

The novel direct travel mechanism is particularly useful with structures of the type shown in FIGURE 7 in that variations of air gap or dielectric thickness of sleeve 41 with different rotational positions of piston 30 are more aggravated than in a structure of the type shown in FIGURES 1 and 2.

In operation, the device of FIGURE 1 operates as a variable capacitor having electrodes 30 and 37. The electrode or piston 30 is adjustably positioned within band 37 whereby the position of the piston 30 determines the capacitance between electrode 37 and piston 30 which is electrically connected to bushing 10.

In accordance with the present invention, however, the piston is driven by a direct travel mechanism whereby the capturing of ears 31a and 31b in slots 27a and 27b of the bushing 27 causes the bushing to execute a linear non-rotary motion responsive to rotation of adjusting screw 25.

It will be obvious to those skilled in the art that the novel features of the present invention are applicable to any type of adjustable device such as an adjustable inductor when piston 30 would be magnetic material while band 37 would be a helical winding.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows:

1. In an adjustable capacitor having a first fixed electrode and a second movable electrode and a dielectric member interposed therebetween; said second electrode comprising a piston movable with respect to the other of said electrodes, and mechanism connected to said piston for moving said piston; said mechanism comprising a guide means, a rotatable screw having a position axially fixed with respect to said first electrode and being rotatable about the axis thereof, and a screw receiving member integrally connected to said piston and threadably receiving said rotatable screw; said screw receiving member having a radially outwardly extending section; said radially extending section being received by said guide means; said guide means permitting translation motion of said screw receiving member and preventing rotary motion of said screw receiving member; said guide means comprising a slotted bushing; said piston being telescoped over said slotted bushing; said slotted bushing having a longitudinal slot therein extending through the wall of said bushing and extending to an end of said slotted bushing; said longitudinal slot receiving said radially extending section of said screw receiving member.

2. An adjustable reactance device comprising the combination of a hollow dielectric form having an electrode secured thereto, a conductive piston contained coaxially within said dielectric form and being movable along the axis of said hollow dielectric form, a support bushing, and an operating mechanism for moving said piston with respect to said dielectric form; said bushing having an enlarged diameter portion receiving and supporting one end of said dielectric form, and an axially extending portion positioned within and concentric with said dielectric form; said axially extending portion of said bushing having an axially directed slot therein extending to a free end thereof; said piston being contained between the outer diameter of said extending portion of said bushing and the inner diameter of said dielectric form; said operating mechanism including an elongated operating screw and a screw receiving member; said bushing having an interior bushing portion; said elongated screw having an extending section; said extending section of said screw being captured in said interior portion of said bushing whereby said elongated screw has a position which is axially fixed with respect to said bushing and said elongated screw is rotatable with respect to said bushing; said screw receiving member being integrally connected to said piston and threadably receiving one end of said screw member; said screw receiving member having an extending portion;

said extending portion of said screw receiving member being slidably received by said slot in said bushing.

References Cited
UNITED STATES PATENTS

| | | | |
|---|---|---|---|
| 1,552,185 | 9/1925 | Alcox | 317—253 |
| 2,868,030 | 1/1959 | Forwald | 74—424.8 |
| 3,051,879 | 8/1962 | Lazar et al. | 317—249 |
| 3,068,384 | 12/1962 | Barnes | 317—249 |
| 3,071,716 | 1/1963 | Young | 317—249 |
| 1,625,330 | 4/1927 | Pinkus | 317—251 |
| 2,912,647 | 11/1959 | Krystek | 317—249 X |

LEWIS H. MYERS, *Primary Examiner.*

JOHN F. BURNS, JAMES SAX, *Examiners.*

E. GOLDBERG, *Assistant Examiner.*